United States Patent
Manolescu et al.

(10) Patent No.: US 9,076,125 B2
(45) Date of Patent: Jul. 7, 2015

(54) VISUALIZATION OF PARTICIPANT RELATIONSHIPS AND SENTIMENT FOR ELECTRONIC MESSAGING

(75) Inventors: Dragos A. Manolescu, Kirkland, WA (US); Matthew Jason Pope, Seattle, WA (US); Raymond E. Ozzie, Seattle, WA (US); Henricus Johannes Maria Meijer, Mercer Island, WA (US); F. David Jones, Bellevue, WA (US); Mary P. Czerwinski, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 579 days.

(21) Appl. No.: 12/394,251

(22) Filed: Feb. 27, 2009

(65) Prior Publication Data

US 2010/0223581 A1    Sep. 2, 2010

(51) Int. Cl.
G06F 17/30    (2006.01)
G06Q 10/10    (2012.01)
G06Q 10/00    (2012.01)

(52) U.S. Cl.
CPC ............... *G06Q 10/10* (2013.01); *G06Q 10/00* (2013.01)

(58) Field of Classification Search
CPC ..................................................... G06Q 10/10
USPC ........................... 707/700; 715/853; 709/225
See application file for complete search history.

(56) References Cited

U.S. PATENT DOCUMENTS

| | | | |
|---|---|---|---|
| 5,905,863 A * | 5/1999 | Knowles et al. | 709/206 |
| 6,594,673 B1 | 7/2003 | Smith | |
| 6,631,412 B1 * | 10/2003 | Glasser et al. | 709/224 |
| 6,816,873 B2 * | 11/2004 | Cotner et al. | 1/1 |
| 6,819,256 B2 | 11/2004 | Hampton | |
| 6,967,594 B2 * | 11/2005 | Gerrity | 340/963 |
| 7,007,067 B1 * | 2/2006 | Azvine et al. | 709/206 |
| 7,073,129 B1 | 7/2006 | Robarts et al. | |
| 7,167,910 B2 | 1/2007 | Farnham | |
| 7,281,215 B1 | 10/2007 | Canfield et al. | |
| 7,395,507 B2 | 7/2008 | Robarts et al. | |

(Continued)

FOREIGN PATENT DOCUMENTS

WO    0180098 A2    10/2001
WO    WO2008040004 A2    4/2008

OTHER PUBLICATIONS

Collins English Dictionary, Dictionary.com, LLC. Copyright. 2011., http://dictionary.reference.com/browse/Tier.*

(Continued)

*Primary Examiner* — Huawen Peng
(74) *Attorney, Agent, or Firm* — Micah P. Goldsmith; Judy Yee; Micky Minhas

(57) ABSTRACT

Providing for graphical visualization of contextual information pertinent to electronic messaging is described herein. By way of example, contextual network usage information or messaging disposition can be determined for a set of participants to electronic communication. The contextual information is compiled into categories and organized at least as a function of category. The compiled data can be transformed into a visualization of user disposition or context and output to a user device as a multi-dimensional graphical rendering. By rendering contextual data graphically, the rich and diverse information available from usage histories, current user context and user dispositions can be output and consumed rapidly and efficiently, resulting in productive electronic interaction.

20 Claims, 11 Drawing Sheets

(56) References Cited

U.S. PATENT DOCUMENTS

| | | | |
|---|---|---|---|
| 7,506,263 B1* | 3/2009 | Johnston et al. | 715/752 |
| 7,610,279 B2 | 10/2009 | Budzik et al. | |
| 7,664,734 B2 | 2/2010 | Lawrence et al. | |
| 8,341,018 B2* | 12/2012 | Malik et al. | 705/14.49 |
| 2001/0049617 A1* | 12/2001 | Berenson et al. | 705/8 |
| 2002/0073313 A1* | 6/2002 | Brown et al. | 713/165 |
| 2003/0079015 A1* | 4/2003 | Fein et al. | 709/225 |
| 2003/0158855 A1 | 8/2003 | Farnham | |
| 2003/0164862 A1 | 9/2003 | Cadiz et al. | |
| 2003/0174060 A1* | 9/2003 | Gerrity | 340/576 |
| 2005/0193011 A1* | 9/2005 | Peebles et al. | 707/104.1 |
| 2005/0204309 A1 | 9/2005 | Szeto | |
| 2006/0080321 A1 | 4/2006 | Horn et al. | |
| 2006/0173824 A1 | 8/2006 | Bensky | |
| 2006/0173957 A1* | 8/2006 | Robinson et al. | 709/204 |
| 2007/0055782 A1 | 3/2007 | Wright | |
| 2007/0237130 A1* | 10/2007 | Milstein et al. | 370/352 |
| 2007/0266025 A1 | 11/2007 | Wagner et al. | |
| 2007/0294763 A1 | 12/2007 | Udezue et al. | |
| 2008/0147805 A1 | 6/2008 | Abecassis et al. | |
| 2008/0172464 A1 | 7/2008 | Thattai et al. | |
| 2009/0106676 A1* | 4/2009 | Brezina et al. | 715/763 |
| 2009/0125371 A1 | 5/2009 | Neylon et al. | |
| 2009/0182828 A1* | 7/2009 | Owens et al. | 709/206 |
| 2010/0082751 A1* | 4/2010 | Meijer et al. | 709/206 |

OTHER PUBLICATIONS

Dmitri Roussinov and J. Leon Zhao, Message Sense Maker: Engineering a Tool Set for Customer Relationship Management, Proceedings of the 36th Hawaii International Conference on System Sciences—2003, http://cq-pan.cqu.edu.au/david-jones/Reading/Conferences/HICSS36/DATA/INCRM06.PDF, 7 pages.

Andrew J. Cowell, et al., Understanding the Dynamics of Collaborative Multi-Party Discourse, Information Visualization (2006) 5, 250-259, http://www.cs.washington.edu/homes/aha/papers/RaceJournal_andrew07.pdf, 10 pages.

Alena Neviarouskaya, et al., Recognition of Affect Conveyed by Text Messaging in Online Communication, D. Schuler (Ed.): Online Communities and Social Comput., HCII 2007, LNCS 4564, pp. 141-150, 2007. © Springer-Verlag Berlin Heidelberg 2007, http://research.nii.ac.jp/~prendinger/papers/alena-HCI2007.pdf, 10 pages.

Marc A. Smith and Andrew Fiore, Visualization Components for Persistent Conversations, Sep. 21, 2000, http://research.microsoft.com/research/coet/Communities/TRs/00-98.pdf, 9 pages.

Gina Danielle Venolia and Carman Neustaedter, Understanding Sequence and Reply Relationships within Email Conversations: A Mixed-Model Visualization, CHI 2003, Apr. 5-10, 2003, Ft. Lauderdale, Florida, USA. Copyright 2003, http://grouplab.cpsc.ucalgary.ca/grouplab/uploads/Publications/Publications/2003-UnderstandingSequence.CHI.pdf, 8 pages.

Marc M. Sebrechts, et al., Visualization of Search Results: A Comparative Evaluation of Text, 2D, and 3D Interfaces, http://www.cs.ubc.ca/~tmm/courses/infovis/morereadings/sebrechts.sigir99.pdf, 8 pages.

U.S. Appl. No. 12/240,569, filed Sep. 29, 2008, Dragos A. Manolescu; Mary P. Czerwinski; David F. Jones; Henricus Johannes Maria Meijer; Raymond E. Ozzie; Matthew J. Pope; Matthew B. Maclaurin, "User Perception of Electronic Messaging."

Damian, et al., "Peer-Sensitive ObjectRank—Valuing Contextual Information in Social Networks" <<http://www.educational-technology.de/Arbeiten/Publikationen/2005/WISE.pdf>> Last accessed Aug. 4, 2008, 8 pages.

Hsieh, et al., "Field Deployment of IMBuddy: A Study of Privacy Control and Feedback Mechanisms for Contextual IM" J. Krumm et al., (Eds.): UbiComp 2007, LNCS 4717, pp. 91-108, 2007 <<http://www.springerlink.com/content/y32j7k2027944217/fulltext.pdf>> Last accessed Aug. 5, 2008, 18 pages.

Office Action for U.S. Appl. No. 12/240,569, mailed on Aug. 20, 2014, Meijer et al., "User Perception of Electronic Messaging" 10 pages.

* cited by examiner

VISUALIZATION OF PARTICIPANT RELATIONSHIPS AND SENTIMENT FOR ELECTRONIC MESSAGING

BACKGROUND

E-mail and other electronic messaging systems have enabled a technical revolution in business and personal communications, and have provided a platform for social and organizational networking. In recent years, use of electronic messaging, such as e-mail, short messaging, text messaging, blogging, electronic forums, and so on, has increased exponentially due to the inexpensive and near instantaneous communication platform that electronic messaging provides. Such platforms have rapidly decreased time required to share and disseminate information, whether for a large, multi-national organization, a network of friends or family members, or remotely located small business partners.

Because of the ease, speed and cost-effectiveness with which computers and computer networking has enhanced human social and business interaction, such devices and networks have been rapidly integrated into human activity. On the enterprise side, efficiencies with which individuals can share information, perform tasks, disseminate instructions, search for knowledge-based resources, expose data to users, or share user concerns have greatly increased by advantages provided by inter-personal networks. Regarding social networks, user inter-connectivity and inter-relatedness has been increased as social networking websites have enabled users to share personal information, media files, media applications, pictures, videos, audio, and so on, over the Internet.

In recent years, a substantial portion of the global population has been able to afford at least one electronic networking device, and many are able to afford multiple such devices. Accordingly, the electronic communication revolution, as some commentators have named the proliferation of electronic networking, has truly become a global phenomenon. Moreover, this phenomenon has enabled near real-time personal and business interaction throughout the globe in a manner heretofore unknown. Accordingly, much research continues in advancing the capabilities and applications for electronic communication, to further enhance human interaction and evolution.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for graphical visualization of contextual information pertinent to electronic messaging. In some aspects, contextual information of message participants, including personal context (e.g., meeting schedule, current tasks, social/business relationships), physical context (e.g., local time, physical location), or messaging disposition (e.g., preferred messaging application, network device) are determined for a set of message participants. The contextual information is compiled into contextual categories, and organized spatially or temporally as a function of category. The compiled data can be transformed into a visualization of user disposition or context and output to a user device as a multi-dimensional graphical rendering. By rendering contextual data graphically, the rich and diverse information available from usage histories, current context and dispositions of messaging participants can be received and consumed much more readily.

According to some aspects of the subject disclosure, message content is evaluated to determine a context thereof. The message content is compared with determined participant context or disposition. Based on a set of compatibility rules, aspects of the message (e.g., language, tone, brevity, etc.) are scored relative to the context or dispositions of message participants. If the score rises above a threshold acceptance level relative the context/dispositions, modifications to aspects of the message contributing to the score can be generated based on the compatibility rules. The modifications can be output as suggested feedback to a participant initiating the message. In addition, context or disposition information supporting the modifications can be emphasized in a context/disposition visualization presented to the user. Accordingly, a user is able to visualize the justification for the modifications, increasing consumption and understanding thereof.

In one or more other aspects, the subject disclosure provides for determining and visually rendering participant response to an electronic message. User activity can be monitored and characterized relative to receiving such a message. The activity, optionally in conjunction with a context or disposition established for the user, can provide an inference of a user's sentiment toward the received message. Sentiment of a set of users can be aggregated and rendered graphically, based on similarities and differences in response or sentiment. The graphical rendering can be output to a message participant to depict how participants received or responded to the message.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
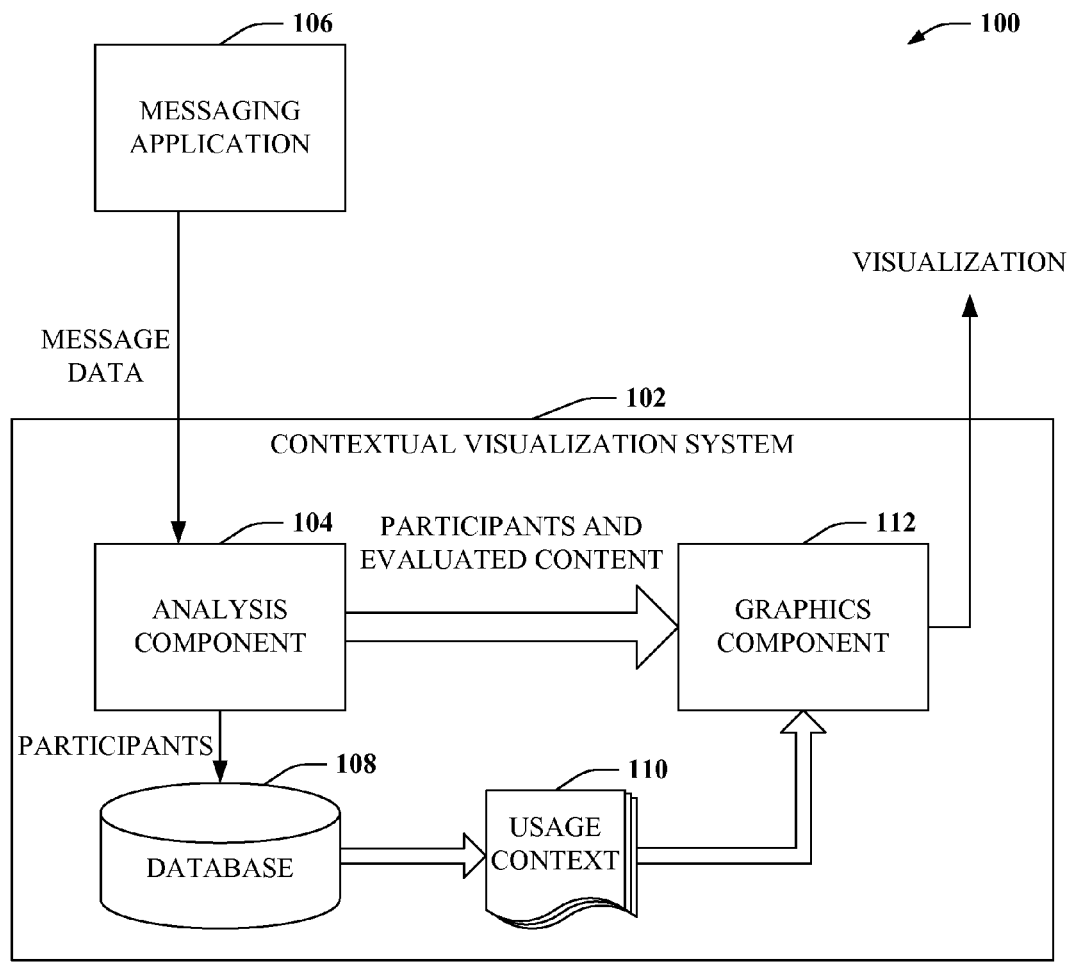
FIG. 1 depicts a block diagram of an example system that provides visualization of context or disposition for participants to an electronic message.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this disclosure, the terms "component," "module," "system", "interface", "engine", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component can be localized on one computer and/or distributed between two or more computers. As another example, an interface can include I/O components as well as associated processor, application, and/or API components, and can be as simple as a command line or a more complex Integrated Development Environment (IDE).

Communication networks have become powerful tools for sharing knowledge and experience in social settings as well as business settings. Currently, such networks can provide real-time dissemination of information, at almost any distance around the globe. Networks can be public, like the Internet and World Wide Web, or private, such as personal or business networks requiring authorized access to a limited subset of users. Furthermore, communication networks can employ wireless device access or fixed-line device access, or both. Additionally, network users can employ various communication devices—whether fixed or mobile—to access a network and communicate, whether by voice, video, or text, plan meetings or business/social events, or the like. In general, electronic communications have greatly enhanced people's abilities to interact and inter-relate, in real-time or near real-time.

Recent applications for communication networks include electronically characterizing human groups and organizations and providing a means of electronic communication between members thereof. Human interactions and relationships, termed social networks, include families, groups of friends, business and investment partners, instant message 'buddies', members of for profit and non-profit organizations, and so forth. In one characterization of inter-personal relationships, individual persons are represented as nodes of a network, and edges between the nodes are based on various interactions and communications between the persons. Each person, or node, is directly connected to others whom the person has direct interaction. Such person is indirectly connected with other persons, whom their direct contacts have direct interaction with, and still other persons who their direct contacts have indirect interaction with (through one or more other persons), and so on. Thus, in such a characterization of inter-personal relationships, a social network is analogous to a large web of interconnected person-nodes.

By storing contextual data of persons and their inter-relationships electronically, for instance in a database that tracks individuals and their direct and indirect relationships, an underlying web of inter-personal relationships can yield an electronic social network. Some electronic social networks are maintained on Internet web sites, including sites such as Facebook®, Twitter™, LinkedIn.com®, and so forth. In addition, many corporations include electronic social networks maintained on private intranets, and some private individuals and businesses maintain electronic social networks on various public and private networks. Electronic social networks that enable individuals to post or share data and media (e.g., photographs, videos, audio recordings, text, blogs, and the like) pertaining to their personal or business interests, hobbies, areas of expertise, research, political views, business ventures, investment portfolios or interests, and so on. In addition, an underlying communication network (e.g., Internet, intranet, mobile communication network, private network) supporting an electronic social network can facilitate electronic communication and data exchange between user nodes of such a social network, in the form of instant message (IM), short message service (SMS), e-mail, voice communication (e.g., voice over Internet Protocol [VoIP], or circuit-switched voice), or other forms of electronic communication. To interact with other network users or with network components supporting the social network, a communication device, such as a computer, mobile phone, laptop, personal digital assistant (PDA), or like electronic device is employed by a network user. Thus, the electronic device provides an interface to the electronic social network and consequently with other network users.

One great benefit provided by electronic social networks is the rich contextual information provided by or collected about users of such networks. Users can provide and update their personal context, such as current tasks, activities, commitments, meetings, etc., physical context, such as location or relative time of day, social or business contacts, relationships with such contacts, context of such relationships (e.g., family member, teammate, workgroup member, business associate, investment partner, etc.), biometric status (e.g., hours of sleep, mood, health), and so forth. Additionally, electronic communications between persons and patterns of communications can provide additional contextual information. For instance, preferred communication devices, messaging applications, application/device features employed by users, rates of usage, time-based usage patterns, and so on, can yield a variety of rich usage information pertaining to such persons. However, although such information exists, messaging and networking applications and devices do not utilize the power of the information in meeting or augmenting user interactions. Much of the contextual information is not even exposed to network users. Furthermore, display of information that is exposed is archaic, typically in a text-based preferences list, or hidden in a set of drop-down menus that a user has to hunt for. Accordingly, a mechanism for extracting and presenting rich contextual information in a manner that enables rapid consumption would be a significant benefit for users of electronic messaging systems.

According to some aspects of the subject disclosure, provided is a mechanism to determine contextual information pertaining to participants of electronic messaging, and extract that information for consumption by the participants or for dynamic contextual analysis or data mining. Data mining and analysis can be employed to provide cross-over evaluation for a set of participants, for disparate types of messaging systems, for different social or environmental settings, and so on. Once extracted, the information can be rendered in a graphical form that facilitates rapid consumption of data. Extracted information can include user usage context determined from user usage history, from explicit user input, from current user physical context or personal status, from user preferences, biometric data, or the like.

Additionally, the extracted information can comprise an overall disposition of a user toward electronic messaging, based on a generalization of the contextual data. The disposition can furthermore be a function of physical or personal context, including time of day, location, status (e.g., in a meeting, driving to work, awaiting a flight at an airport), an initiator/sender of the message, and so on, and be correlated with one or more messaging preferences. For instance, a user's messaging disposition can be positive when the user often receives, responds to or initiates messages, indifferent when the user ignores inbound messages or initiates few messages, and negative when the user does not want to be disturbed (e.g., during a meeting, watching a movie, etc.). Optionally, the disposition can be dependent on other messaging participants, devices employed to connect to a network, time of day, location or status, and so forth. As an example of dependent disposition, a user's disposition might be positive toward mobile messaging and negative toward computer messaging when travelling. As another example, the user's disposition might be positive toward one person (e.g., who has relevant interests/context/disposition toward the user) in one circumstances, while negative toward another in such circumstances. Specifically, if an attorney is in a meeting with a client, the attorney may have positive disposition toward employees of the client, indifferent disposition toward other clients and associated working on matters for the client, and negative disposition toward associates working on unrelated matters. Furthermore, the disposition(s) can be updated over time based on changes in contextual data. For instance, changes in user disposition as a function of time, day of the week, occurrence of a category of events (e.g., during a meeting, proximity to holidays), social setting, degree of inter-relationship or activity with one or more persons, or the like, can be analyzed to generate a dynamic disposition or set of dispositions for a user.

Contextual information determined about a set of network users can be stored in a database for reference in electronic messaging, computed on demand, or both. For instance, if a message is initiated, contextual information pertaining to one or more participants is obtained from the database. The information can be transformed into a multi-dimensional visualization of context or disposition as a function of user. The visualization can then be graphically displayed to a participant (e.g., initiator/sender, recipient—whether copied, forwarded or direct) for rapid consumption. In some aspects of the subject disclosure, a multi-dimensional visualization can be annotated with various text, media, or like information (e.g., text descriptions of various font, style, color, format, etc., photographs, audio, video, and so on) that provides additional detail to a graphical overview. Optionally, the detailed information can be in accessible from a separate user interface view, hidden or minimized, or the like, until activated by a user (e.g., mouse-over activation, pop-up activation, command line activation, toolbar, menu button or drop-down activation, or like user interface input mechanism). In at least some aspects of the subject disclosure, stored contextual information or visualizations thereof can be subject to additional processing or analysis. For instance, the information/visualization can be subject to data mining for related messages of a different set of participants, or exported/imported for analysis by other systems or organizations of users, or the like.

According to further aspects of the subject disclosure, different visualizations can be generated and displayed by user-activation. In one aspect, the visualization can comprise an organizational chart, familial relationships, or social relationships of message participants, optionally emphasizing social, business, or like contextual inter-relationships among participants. For instance, a depiction of user context, disposition or sentiment (e.g., emotional response or charge, attitude, opinion, etc.) organized based on relevance to message content, and annotated with associated user identities, can be re-rendered as a social network connectivity map (e.g., with users as nodes and user relationships linking the nodes), where user nodes are annotated with the context, disposition or sentiment data instead. In other aspects, various two dimension (2D) and three dimension (3D) charts, graphs, histograms or other statistical renderings can be generated to display user sentiment in response to a message, disposition of a set of users, professional or social interests, expertise, status, history, location, proximity with one or more other users, etc., of a set of users, current physical context of users, and so forth. According to still other aspects, graphical renderings of network performance in disseminating data or facilitating user consumption of data can be provided. Accordingly, the subject disclosure provides for mining, extracting and graphically rendering a rich set of contextual data pertinent to electronic messaging, social networking or the like, to facilitate more efficient user interaction and more rapid consumption of data.

According to at least one aspect of the foregoing, display of a visualization or delivery of a message can be delivered subject to current activity or other contextual information determined about a participant. Where a user is determined to be pre-occupied (e.g., in a meeting, driving to work), or working on a task un-related to a message, the message can be delivered without automatic display of the visualization, to reduce conspicuousness of the message (optionally subject to user profile settings). In other aspects, delivery of the message can be delayed a certain amount of time, or delivered to a pre-determined device (e.g., a mobile device if the participant is determined to be travelling, or currently logged onto such device). Accordingly, message delivery and/or rendering of a visualization of context/disposition can be queued based on a current context of the participant.

It should be appreciated that, as described herein, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). The aforementioned carrier wave, in conjunction with transmission or reception hardware and/or software, can also provide control of a computer to implement the disclosed subject matter. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Turning now to the figures, FIG. 1 illustrates a block diagram of a sample system 100 for graphically rendering contextual information pertinent to electronic messaging or social networking. The contextual information can be inferred from user use of an electronic social network or electronic messaging platform, habits related thereto, user network/messaging preferences, whether inferred or explicitly input, electronic interaction history with other users, external data sources providing user social or business status (e.g., from an instant messaging client or calendar application), corporate directory and structural hierarchy of employees, contractors, suppliers, clients, etc., or the like. Contextual information of one or more participants is compared with message content, and a multi-dimensional visualization of participant context or overall disposition relevant to the message content can be generated and output by system 100. The visualization can be rendered at a user interface display, and manipulated via the interface to expose or emphasize various subsets of data. Accordingly, system 100 can provide a substantial benefit for network users by extracting contextual information pertaining to relevant persons and displaying the information in a manner that facilitates visual data consumption.

System 100 can comprise a contextual visualization system 102 that provides a visualization of participant context pertinent to electronic messaging or social networking. The visualization system 102 can obtain data from an electronic messaging application 106 pertinent to one or more electronic messages, initiated or received, at the application 106. In some aspect, the visualization system 102 can comprise an application plug-in that compiles and submits messaging data to other components (104, 108, 112) of the visualization system 102 when a message is initiated or received at the application 106. In other aspects, the visualization system 102 can poll the application 106 for pertinent messaging data (e.g., periodically, or based on some non-periodic or non time-based function or event). Information provided to the visualization system 106 can include participants to the message, such as a message initiator(s) or persons or aliases included within a To field, Copy field, Blind Copy field, or the like. Furthermore, the information can include various style, font, format, graphical, media, or like data utilized to render a message or included/attached with the message. In at least some aspects, physical or statistical usage information pertinent to a communication device, application or network can be provided in addition to content analysis. Such usage information can include typing speed, number of corrections/typos, touch pressure, and so on, biometric information, such as body temperature, pupil dilation, physical movements, sweating, tension, blood pressure, etc., or ambient information, such as temperature, or humidity at time of compilation, position location, local time, and so on. Thus, the participant context can be collected from a variety of data personal to the user, user location, devices/application employed by the user, or the like.

Data received from the messaging application 106 is evaluated by an analysis component 104. The analysis component 104 can parse and identify different aliases (e.g., e-mail address, instant message alias) or identities (e.g., name or portion of a name) of such participants. Furthermore, the analysis component 104 can evaluate content of the message and infer a context thereof. In some aspects, the analysis component 104 can employ language recognition processing (e.g., Natural Language Processing [NLP] algorithms) to estimate a meaning or context of language included in the message content. In other aspects, the analysis component 104 can also evaluate attachments to the message, including word processing attachments, spreadsheet attachments, presentation slide attachments, photograph attachments, video attachments, audio attachments, or like application or media attachments. Various text, media or language recognition algorithms (not depicted), known in the art, can be employed in evaluating the message attachments and inferring meaning or context of such material. The meaning/context can be stored in a database 108, for later analysis and processing (e.g., to refine context or disposition based on biometric response data of one or more participants). Additionally, the meaning/context of the message content or attachments can be provided to a graphics component 112.

Once determined, analysis component 104 submits the participants, message content or evaluated context data to database 108. The database 108 can store and organize such information to characterize the network usage context or messaging disposition for a set of network users. For instance, preferences, context, usage histories, dispositions and so on can be stored as a function of user. Additionally, users can be correlated with other users based on similarities or disparities in preference, context, usage history, etc., of various users (e.g., determined by data mixing and analysis methodologies). Database 108 can update user context/disposition/usage data as new data is obtained, resulting in an evolving characterization of user context or disposition that can adapt to changes in user activity.

Upon receiving a set of participants from analysis component 104, database 108 can extract user context, usage or disposition data pertinent to one or more such participants and output the data to the graphics component 112 as a set of context files 110. Graphics component 112 cross-correlates the user context information (110) with the message meaning or context derived by analysis component 104 to identify contextual or disposition information pertinent to such content. Different subsets of data can be assigned degrees of relevance based on contextual associations with the message content or a context thereof. The pertinent information can then be organized into a multi-dimensional visualization for display at a user interface device (not depicted, but see FIG. 5, infra).

In some aspects, a multi-dimensional visualization can be organized in tiers of relevance, where data of primary relevance is emphasized in the visualization. Also, the visualization can be spatially or temporally structured (e.g., separate by distance along a vertex, or time between display of successive data, respectively) based on various logical relationships of different categories of data. Thus, for instance, the visualization can be organized to emphasize inter-personal relationships of message participants, or other network users associated with such participants (e.g., in a social network—characterized at least in part by database 108), that are pertinent to the message content. In other aspects, the visualization can be organized to emphasize user contexts or dispositions pertinent to the content. According to yet other aspects, the visualization can be organized to emphasize combinations of user relationships or user contexts pertinent to the message content. It should be further appreciated that categories of data having lower emphasis or lower relevance to message content can be annotated to, or otherwise organized with lesser emphasis with respect to, primary aspects of the visualizations. Accordingly, the visualizations can graphically present different tiers of information, organized based on relevance, context or preference of a user.

Figure 2:
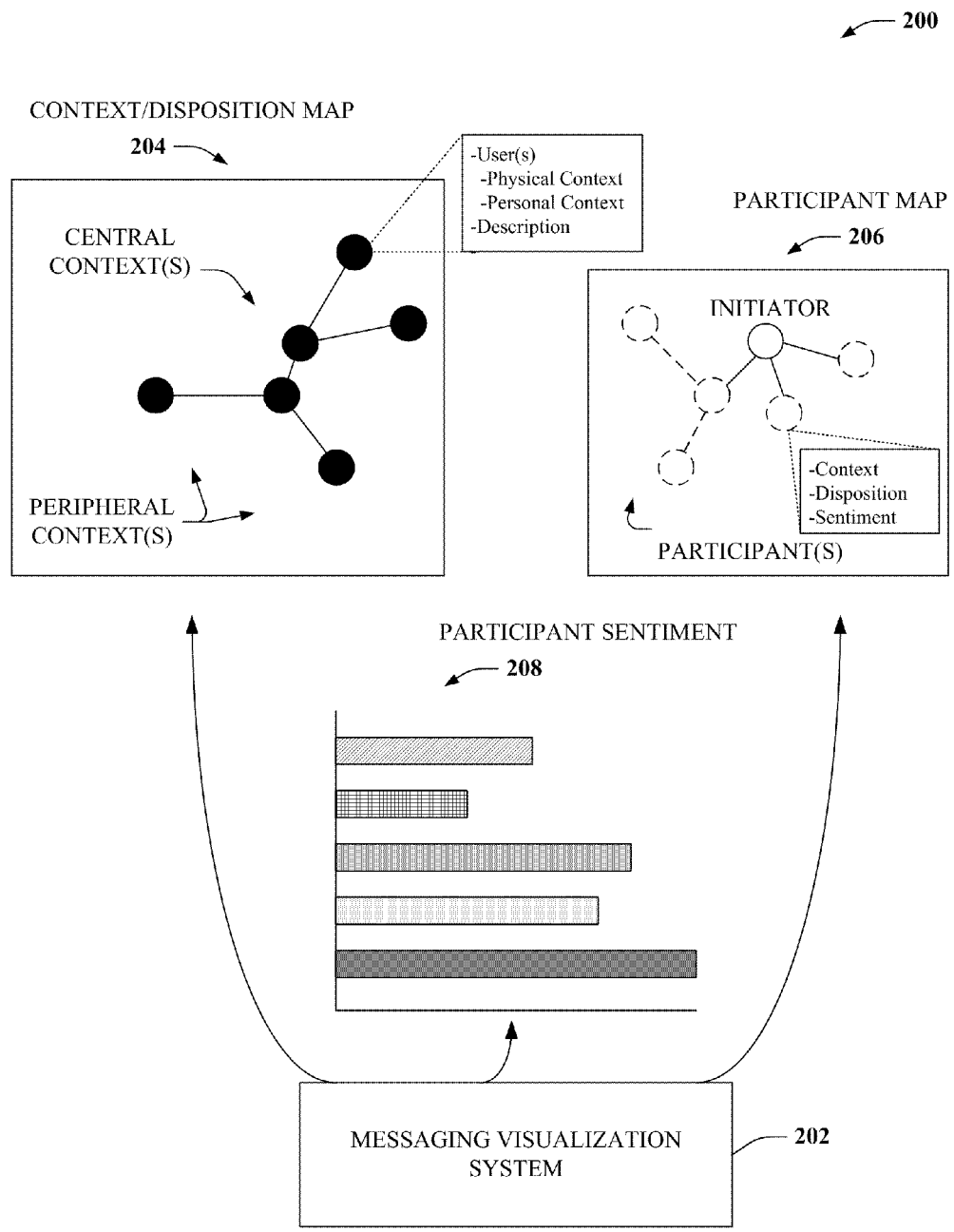
FIG. 2 illustrates a block diagram of sample visualizations of message sentiment, user relationships and user context according to aspects disclosed herein.

FIG. 2 illustrates a block diagram 200 of various visualizations for displaying user context, disposition, or sentiment pertinent to electronic messaging or social networking. As depicted, a messaging visualization system 202 can output the various visualizations (204, 206, 208) in a format suitable for rendering at a user interface device. The visualizations (204, 206, 208) can be based on a plurality of categories of data, including user network usage context (e.g., characterizing user usage of a communication network, social network, or electronic messaging platform), messaging disposition (e.g., characterizing user temperament or outlook toward messaging or types of messaging), sentiment (e.g., in response to a received message or interaction with other users), or a combination thereof. Furthermore, the visualizations (204, 206, 208) can be organized based on various primary and secondary categories of data relative to message content. According to some aspects, users can switch between different organizations to change a view or context in which data is presented. Furthermore, secondary data annotated to primary visualizations (e.g., icons, nodes, graphics) can be emphasized upon selection, command, or the like. Accordingly, the visualizations (204, 206, 208) can display various categories of data with various degrees of visual or auditory conspicuousness, to facilitate rapid consumption of relevant or selected data.

In some aspects, a visualization 204 can be organized with respect to user contexts or dispositions for a set of message participants. A most common context or disposition can be central to the visualization, to convey greater relevance, whereas less common contexts or dispositions can be displayed spatially (e.g., by distance from the central aspects) or temporally (e.g., displayed sequentially over varying amounts of time) distant from the central context, to denote lesser relevance or degrees thereof. As an example, where several participants have a personal context of 'in a meeting', or a messaging disposition that is 'negative' for receipt of messages (e.g., optionally with respect to a particular sender, message content, communication device, time of day, and so forth), the visualization can be organized with these common contexts as central or primary. Thus, a message initiator could quickly determine that the message will not be read by several participants, or might be read only after some time has passed (e.g., depending on the platform—e-mail, IM, SMS—used to send the message, device the message is received at etc.). In one particular example, a context or disposition can indicate a particular person who is an ideal resource to respond to a message, based on knowledge, experience or availability of participants. In such case, the visualization can be organized based on the preferred human resource, with the ideal person(s) central to the visualization, or otherwise emphasized. Other, less common or less relevant contexts/dispositions, such as a single user's disposition which is different from a set of common dispositions, might be displayed with lesser emphasis, e.g., at outer edges of a visualization (spatial displacement), or after a relatively long delay after a display of the central disposition (temporal displacement), etc. In at least one aspect of the subject disclosure, relevance of an individual or context/disposition of the individual can be weighted with respect to associations among message participants. For instance, if one recipient is an initiator's supervisor, their context/disposition can be given higher relevance, even if different from a large number of other recipients (e.g., see FIG. 4, infra for relevance weighting).

In at least some aspects of the subject disclosure, changes in user context, disposition or inter-relationship with other participants or message content can be captured to provide dynamic context for users. Evolution of message content or user usage can be captured by visualizations and displayed as a function of time, of subsequent messages, or the like. In other aspects, changes in context, disposition, content progression or personal relationships can be emphasized in various manners in a single visualization, or in a series of visualizations to depict the evolution of such captured concepts.

In at least one aspect, visualization 204 can represent distinct contexts/dispositions or categories thereof as nodes of a connectivity map, bars on a bar graph, curves on an area map, or other suitable mechanism for displaying relative quantities or qualities of data. The nodes/bars/curves can include other categories of data attached to the visual representations thereof. For instance, a bar on a bar graph, representing a particular context/disposition, could be associated with a description of the context/disposition, names of users sharing the context/disposition, user or data relationships resulting in a particular relevance score for the context/disposition, and the like. Such other categories of data can be displayed with lesser emphasis (e.g., hidden, minimized, organized in a separate window, or combinations thereof or of the like) to denote lesser relevance. If selected by a user (e.g., mouse-over, command-line, tool-tip button, or other form of interface input or selection), a particular category of data can be displayed with greater prominence to facilitate ease of viewing.

In addition to the foregoing, a visualization 206 can be organized with respect to individual participants to an electronic message, or associated with an electronic social network, that are relevant to the message content. Relevance can be determined based on user context, such as whether the user is working on a task related to the subject of the message, has an expertise in an area identified from the message, experience with a task identified from the message, relationship with a sender or other relevant participant, member of a common social group, business group, familial group, or other suitable correlation between persons. Participants of higher relevance can be displayed centrally or with higher prominence (e.g., center of a connectivity map, larger bars on a bar graph, greater area on an area map, and so forth), whereas participants of lesser relevance can be displayed with lower prominence. Aspects of the visualization 206 representing individual participants can be annotated with contextual information pertinent to the participant. As discussed above, the annotated information can be displayed with lower prominence, and emphasized when selected by a user, facilitating depiction of tiers of data based on relevance to message content or message initiator (or, e.g., relevant to another specified participant or non-participant).

In at least one other aspect of the subject disclosure, messaging visualization system 202 can output visualizations (204, 206, 208) of message sentiment, whether context-based connectivity maps (204), participant-based connectivity maps (206), or statistical charts, histograms or the like (208). Message sentiment can be characterized based on a participant's response to a received message. Such response can be determined by monitoring user activity (e.g., adding a received message to a to-do list), actions, or device interactions associated with a received message (e.g., see FIG. 3, infra). Accordingly, such visualization (204, 206, 208) can provide a quick, at-a-glance representation of how a message is received by other participants (e.g., depicting which recipients have queued the message for later response, forwarded the message, deleted the message, responded to the message, commented verbally in response to the message—a positive comment spoken to a neighbor, for instance, and so forth). Although modern electronic communication provides for rapid dissemination of information, the information is limited in an ability to convey non text-based information, such as body language, biometric stimuli-response information, tone of voice, mannerisms, reflexive responses, and the like, which often accounts for a large fraction of the communication. By monitoring user actions and activities, a greater degree of such information can be captured and thus communicated. Furthermore, the subject disclosure provides for visual representation of such information to facilitate rapid consumption thereof by communication partners.

Figure 3:
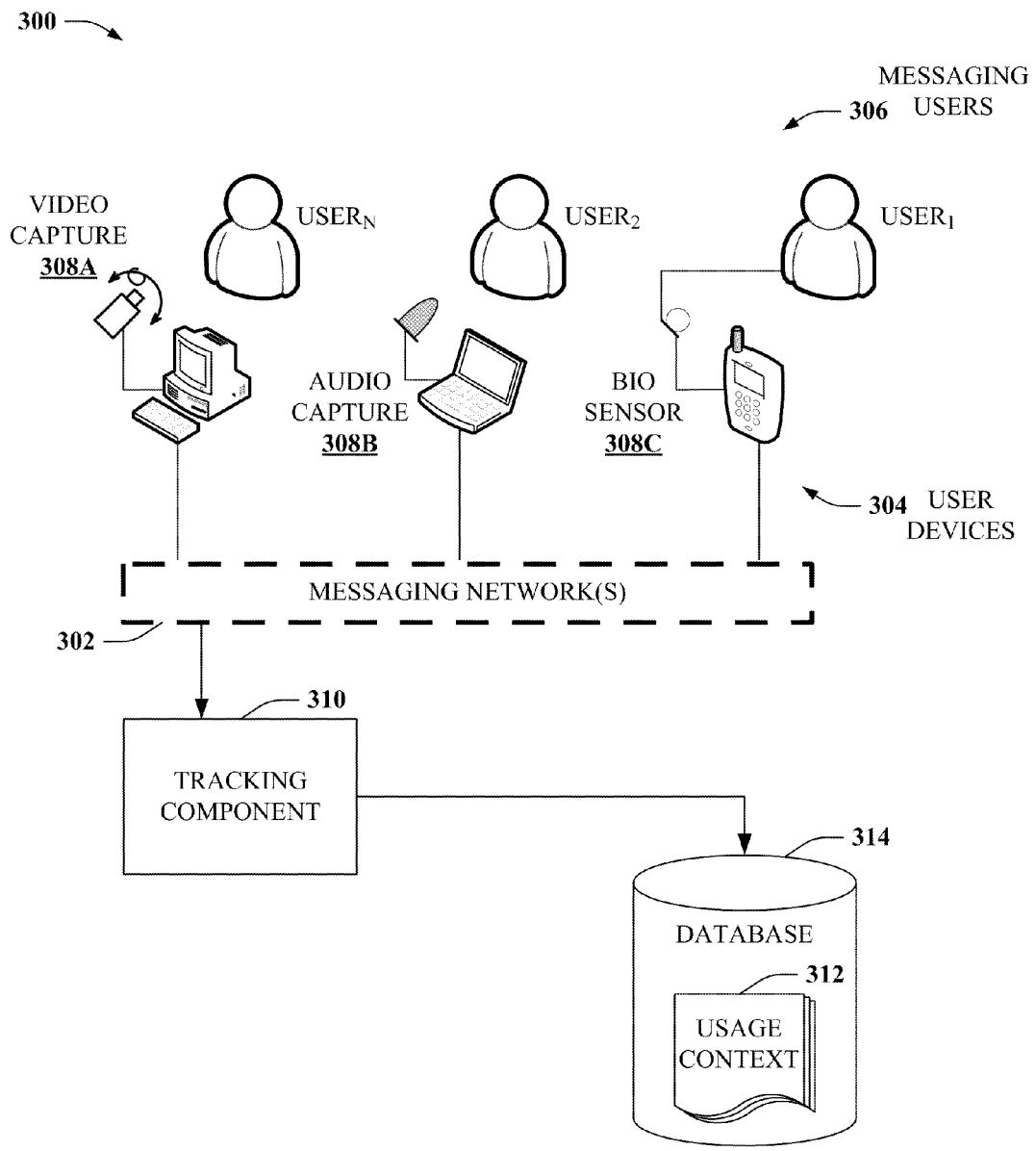
FIG. 3 depicts a block diagram of an example system for monitoring user activity to determine user context or disposition relative electronic messaging.

FIG. 3 illustrates a block diagram of an example system 300 for characterizing user context, disposition or sentiment. Characterizations can be modeled by monitoring user actions, activities, physical or emotional responses, or the like, in response to pertinent stimuli. Thus, for instance, regarding electronic communication, user activities, actions or responses to a received message can be utilized to infer a user's sentiment toward the message. Furthermore, digital characterization of the activities/actions/responses can also lead to a digital characterization of such sentiment. Often in electronic communication, information conveyed via physical or emotional response is not conveyed with a message, especially in text-based communication. Accordingly, system 300 provides a mechanism to characterize user sentiment with respect to a communication, and furthermore to aggregate and display sentiment of multiple users pertinent to a message or chain of such messages.

System 300 can comprise a set of messaging networks 302 that facilitate electronic communication between user devices 304. The network(s) 302 can comprise an e-mail network, IM network, SMS network, mobile communication network, wireless local area network (WLAN), ad-hoc wired or wireless network, wireless wide area network (WWAN), or a combination thereof or of the like. Users 306 can access the network(s) 302 by employing one or more network communication devices 304. Such devices 304 can comprise a desktop computer, computer terminal, mainframe interface, mobile telephone, networked game console, laptop computer, personal digital assistant (PDA), or various other electronic devices or communication devices, or combinations thereof.

System 300 can further comprise a tracking component 310 that monitors user usage of the user devices 304, or of messaging applications, systems, software, etc., associated with the user devices 304, to characterize usage context for a set of users 306. As described herein, the usage context can be based on various data, including an application(s) commonly employed for messaging, type of device(s) commonly employed for messaging, messaging platform(s) commonly employed (e.g., e-mail, social network website or web page, IM, SMS, chat room, message forum), frequency with which applications/devices/platforms are employed, expertise with such applications/devices/platforms (e.g., measured with respect to a control set of users), a set of user preferences specified by a user or inferred from usage histories, and the like. In addition to the foregoing, usage context can be based on a user's physical location or local time of a participant, preferred network interface device/application/platform, a device or application that the participant is logged onto the network 302 with, a time of day/week that the participant prefers to read or respond to messages (e.g., based on frequency thereof or user input), a statistical characterization of the participant's messaging activity (e.g., frequency or time-based characterization of when, where, what device, etc., activity is conducted), explicit participant input, or the like, or a combination thereof.

In at least one aspect of the subject disclosure, system 300 can comprise one or more sensors 308A, 308B, 308C to capture physical activity or responses of the user, and infer usage context, disposition or emotions response/state. The sensors can comprise a video monitor 308A (e.g., a camera, video camera, infrared camera, etc.), audio monitor 308B (e.g., microphone, speech analyzer), biometric sensors 308C (e.g., heart-rate monitor, blood pressure monitor, body temperature monitor, breathalyzer for determining body drug, alcohol or medication content), or the like (e.g., sensors 308A, 308B, 308C could also comprise a global positioning system for determining position location, thermometer or barometric pressures sensor for determining temperature or humidity, respectively, or other ambient environment sensors). The sensors 308A, 308B, 308C can be associated with various software for inferring emotional response, user sentiment or disposition from media (e.g., audio, video) or biometric data. For instance, the software can comprise media analysis software (not depicted) to convert audio or video activity (e.g., sounds, speech, reflexes, tension, laughter, crying, facial expressions, eye movement, pupil dilation, sweating, change in body temperature, blood pressure or heart-rate, relative speed or haste in performing an activity) into a category of physical or emotional state (e.g., nervous, agitated, productive, happy, relaxed, sad). The activity and state can be employed to assist in determine a user's general disposition (e.g., toward device usage or electronic communication in general, based on an aggregation of relevant data), or the user's sentiment toward a particular message, or messaging partner (e.g., based on receipt of a message, or interaction with a particular person). In the latter case, for instance, system 300 could characterize a user's response in the context of an electronic social network or dating service, indicating physical or emotional response or disposition to an online profile of another user of the network/service.

Information captured and analyzed by sensors 308A, 308B, 308C or tracking component 310 can be collected by the tracking component 310 and stored in a user database 314. The database can manage the context/disposition/sentiment data in one or more files 312, spreadsheets (312), or other database structures, at least as a function of user. In some aspects, the data can also be stored or referenced as a function of category of context, instance of communication, or other suitable category of information. The context files 312 maintained by the database can be provided to a message visualization system to generate multi-dimensional visualizations of user context/disposition/sentiment data, as described herein.

Figure 4:
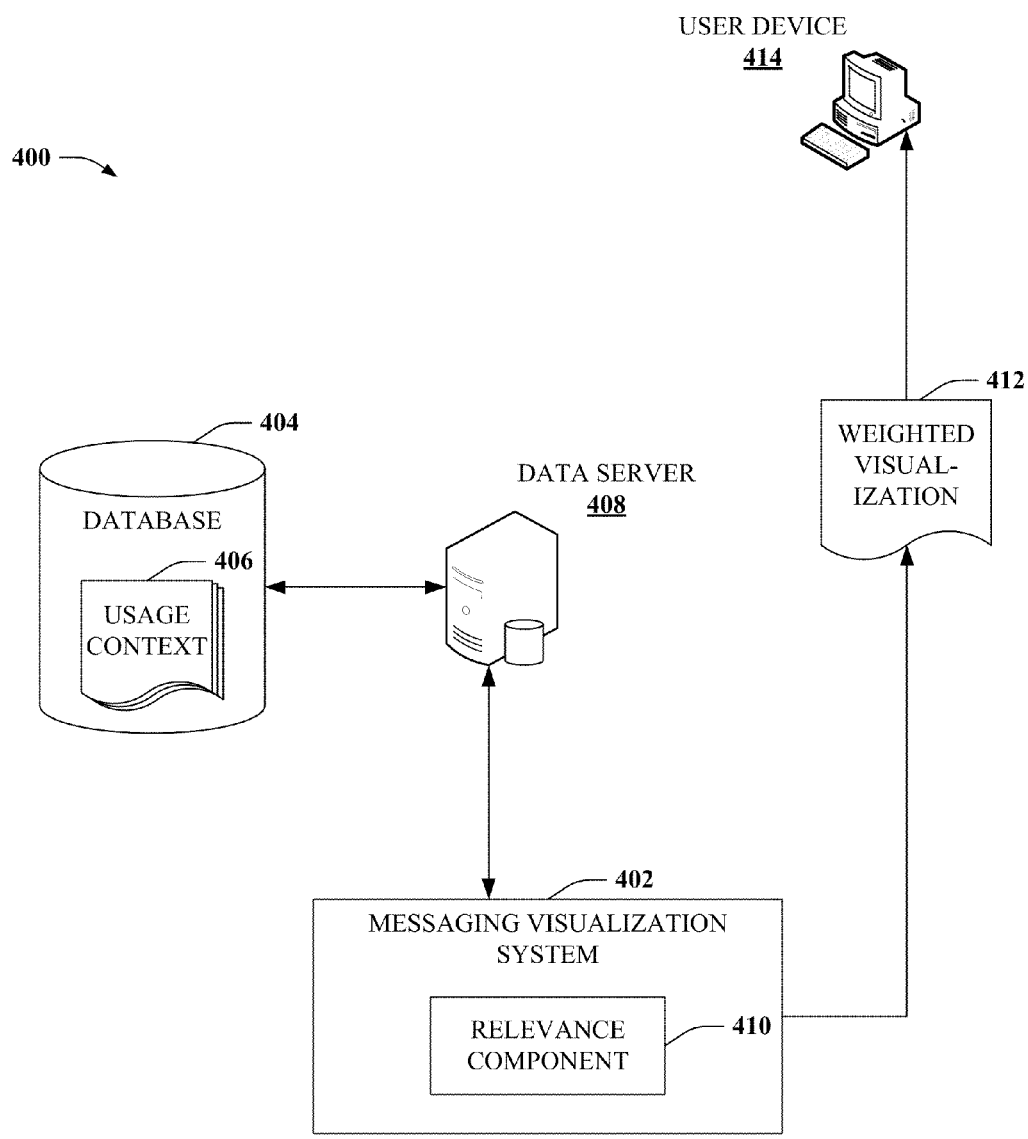
FIG. 4 illustrates a block diagram of a sample system for depicting user context or disposition as a function of relatedness to a message participant.

FIG. 4 illustrates a block diagram of an example system 400 for providing weighted visualizations of user relationships for electronic networking and electronic communication according to additional aspects of the subject disclosure. System 400 can comprise a messaging visualization system 402 that generates multi-dimensional visualizations of user context for various user interactions. The visualizations can be generated from a set of data 406 characterizing the user interactions. Such data can include electronic interactions or communication, and content or context thereof, personal interaction, characterized by one or more electronic sensor devices (e.g., see FIG. 3, supra), including user actions, activities or responses thereto. The data, stored in a user context database 404, can be distributed to the messaging visualization system 402 by a data server 408. Such server can be a server (408) that manages access to or storage of data within the database 404. Additionally, results of data evaluation conducted by the messaging visualization system 402 can be uploaded to the user context database 404 for later reference, or for updating characterization of user relationships, context, disposition or sentiment.

In addition to the foregoing, messaging visualization system 402 can comprise a relevance component 410 that weights user data (e.g., usage context, messaging disposition, message sentiment, user inter-relationship) with a degree of relatedness between a user and other users. The weighting can be applied to various user characterizations or visualizations thereof. For instance, data characterizing a user's messaging disposition or network usage context, as described herein, can be weighted based on a degree or type of relationships between the user and one or more other relevant users (e.g., relatedness within a social network, sharing a common task, and so on). Thus, for instance, data characterizing contexts/dispositions of a set of message participants can be weighted in importance based on relatedness of the participants to a message initiator within a social network. Alternatively, or in addition, contexts/dispositions of the participants can be weighted relative to their pertinence to message content (e.g., whether a participant is working on a task discussed in the message, has expertise therein, etc., or whether the participant is only peripherally related to the task).

Messaging visualization system 402 can then take the weighted context/disposition/sentiment data and generate a visualization that graphically presents the weighted data. Accordingly, the visualization could emphasize (e.g., by centralizing, displaying for a longer period of time, positioning closer to the user, displaying with a higher representational quantity) context that is more pertinent to a communication, or more meaningful to a participant, or minimize context that is less pertinent/meaningful. The weighted visualization can be output in a file or application format 412 suitable for display at a user device 414, and submitted to such device 414.

Figure 5:
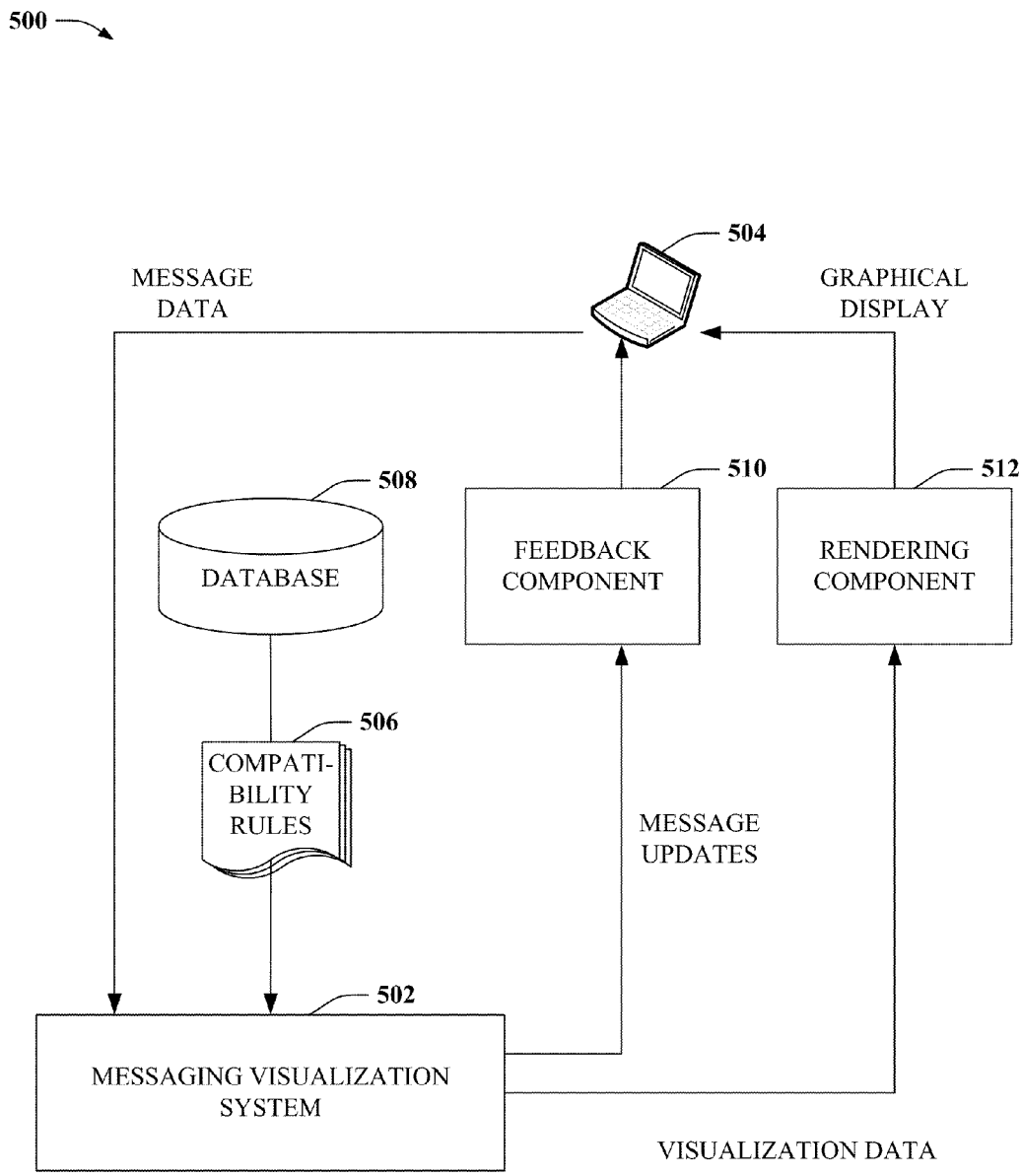
FIG. 5 depicts a block diagram of an example system for providing predictive feedback for electronic messaging based on participant context or disposition.

FIG. 5 illustrates a block diagram of an example system 500 for providing predictive feedback for electronic messaging. System 500 can comprise a messaging visualization system 502 that provides a multi-dimensional visualization of message context or user usage context or disposition, as described herein. Additionally, based comparing the user usage context or disposition to message context, compatibility of the content and recipients can be determined. For instance, the message visualization system can reference a set of compatibility rules 506 from a rule database 508. The compatibility rules can establish contextual scores for message language, tone, style, format, or other content or context. Thus, a message including harsh, aggressive, demeaning or abusive language can be deemed relatively abrasive, and scored appropriately with respect to abrasiveness. Additionally, the scores can further be dependent upon context or disposition of one or more message participants. For instance, if one participant's disposition typically includes emotional sensitivity to electronic messaging, the harsh/aggressive message can be scored higher with respect to abrasiveness.

The compatibility rules 506 can further include threshold content characterization scores for message compatibility. Compatibility can be relative to contexts/dispositions of a set of message participants, relative to a particular context, meaning or topic of a message (e.g., business communication, social communication, familial communication), a particular relationship or type of relationship of one or more participants (e.g., drinking buddies, investment partners, spouses), or personal context of such relationships (e.g., based on prior communication among participants and context/disposition thereof). Based on a total characterization score of a message, compared with threshold compatibility of message recipients, appropriateness of the message can be determined by messaging visualization system 502. Where necessary, the system 502 can identify aspects of the message contributing to an inappropriate characterization score, and generate modifications to the message content or participant list to improve the characterization score relative the threshold compatibility. The generated changes can be output by a feedback component 510, which can display the changes while the message at the user device 504 as predictive feedback for a message initiator.

It should be appreciated that message content and compatibility scores can be determined as message content is compiled or style/format established. Accordingly, the messaging visualization system 502 can obtain the message data in real-time or near real-time to provide such contemporaneous feedback. Furthermore, the scoring can be extensible and importable/exportable from messaging visualization system 502. In such aspects, content and compatibility scores can adapt over time, and be applied to multiple usage contexts or dispositions for various users, based on various messaging architectures (e.g., e-mail, SMS, IM, voice-chat, etc.), or various communication devices. Moreover, the scoring can be analyzed by external processing (e.g., third party analysis tools) to provide specialized analysis, potentially resulting in diverse monetization options for system 500.

In addition to the foregoing, a visualization of user context/disposition or message content, as described herein, can emphasize or highlight aspects of a message contributing to a particular compatibility score (e.g., message content, style, format, etc.), as well as how the proposed changes can adjust the score. Accordingly, justification for message modifications can be presented graphically by the message visualization system, to facilitate increased user understanding of factors contributing to message scoring (determined by the system 502) as well as understanding of remedial measures suggested to modify the scoring. The graphical visualization is output by a rendering component 512 to user device 504, for display at such device.

The aforementioned systems have been described with respect to interaction between several components. It should be appreciated that such systems and components can include those components or sub-components specified therein, some of the specified components or sub-components, and/or additional components. For example, a system could include contextual visualization system 102, messaging application 106, and tracking component 310, database 314, data server 408 and feedback component 510, or a different combination of these and other components. Sub-components could also be implemented as components communicatively coupled to other components rather than included within parent components. Additionally, it should be noted that one or more components could be combined into a single component providing aggregate functionality. For instance, feedback component 510 can include rendering component 512, or vice versa, to facilitate displaying messaging feedback and graphical visualization of such feedback by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

Figure 6:
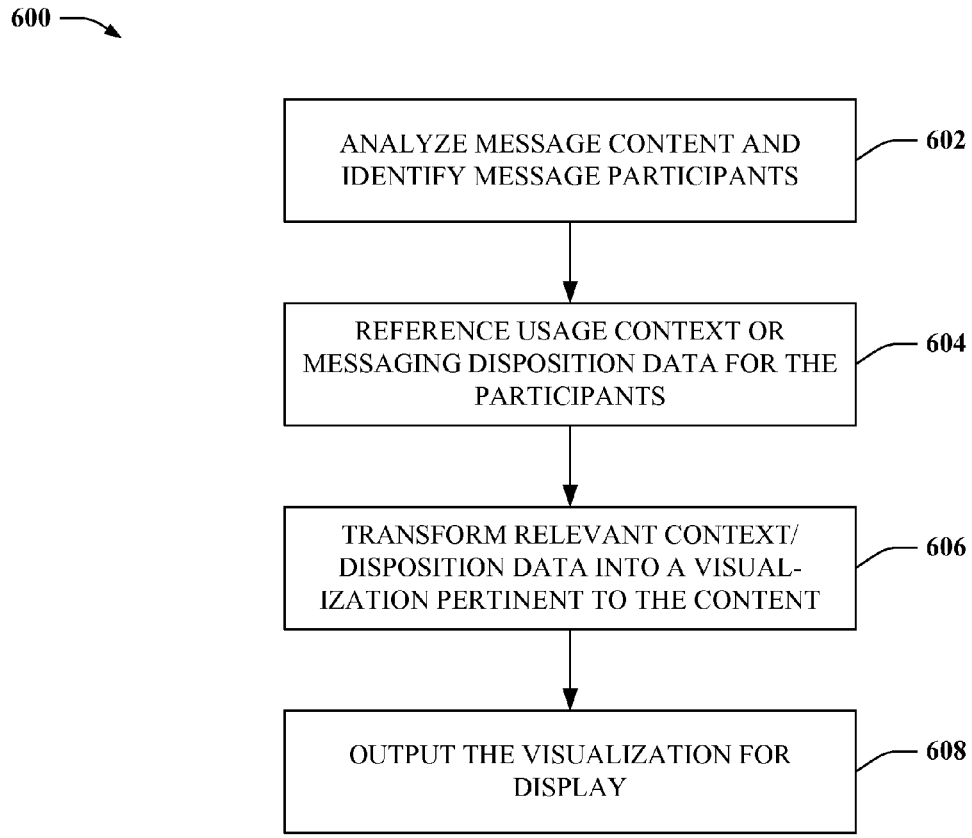
FIG. 6 illustrates a flowchart of an example methodology for providing visualization of context or disposition of electronic messaging participants.

FIG. 6 illustrates a flowchart of an example methodology 600 for providing visualization of context or disposition of electronic messaging participants according to aspects of the subject disclosure. At 602, method 600 can analyze content of an electronic communication and identify participants to the communication. At 604, method 600 can reference a database of user usage context or messaging disposition data for the set of participants. At 606, method 600 can transform context/disposition data relevant to one or more identified participants into a multi-dimensional visualization pertinent to the analyzed content. As one particular example, the transformed context/disposition data could be utilized to visually represent a likelihood of receipt of the communication in a particular period of time, based on recipient physical context or personal context (e.g., determined from calendar appointments, status, schedule, or the like). As another example, the transformed context/disposition data could depict a likely response to the message based on user messaging disposition or prior user actions or activities in response to similar message content. In yet another example, the transformed context/disposition data could indicate a subset of the identified participants who are most pertinent to the content of the message, or include a subset of non-participants included in a social network of one or more other participants, who could have an interest, expertise, or experience or other relevance to the content. Accordingly, the transformed context/disposition data can be utilized to convey a wide variety of information, depending on message content, participant contexts/dispositions and logical or rule-based relationships thereof. At 608, method 600 can output the visualization for display at a user device, enabling the user to interact with, modify, or consume the depicted data.

Figure 7:
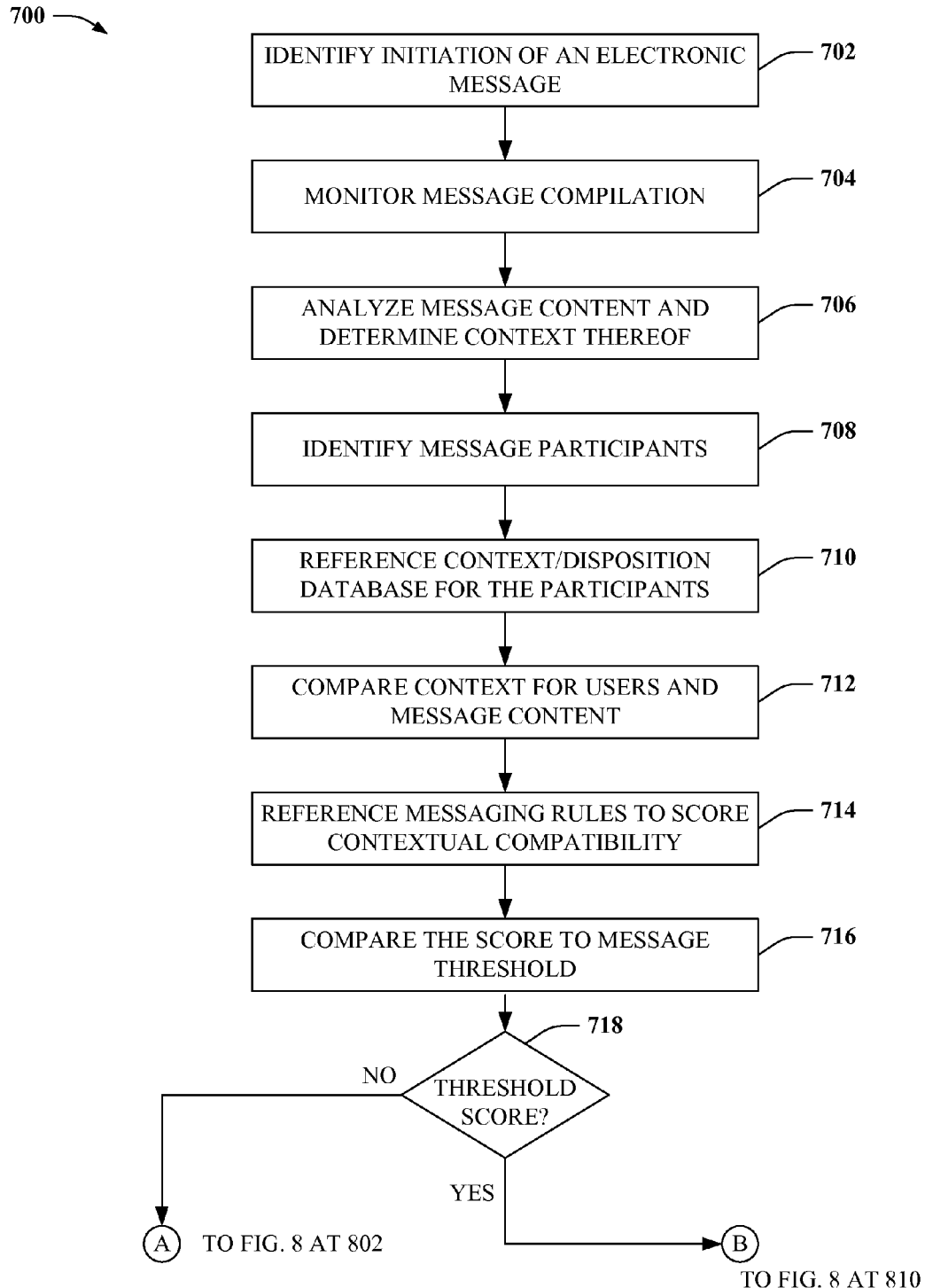
FIGS. 7 and 8 depict flowcharts of a sample methodology for rendering contextual information and feedback for electronic messaging according to some aspects.
Figure 8:
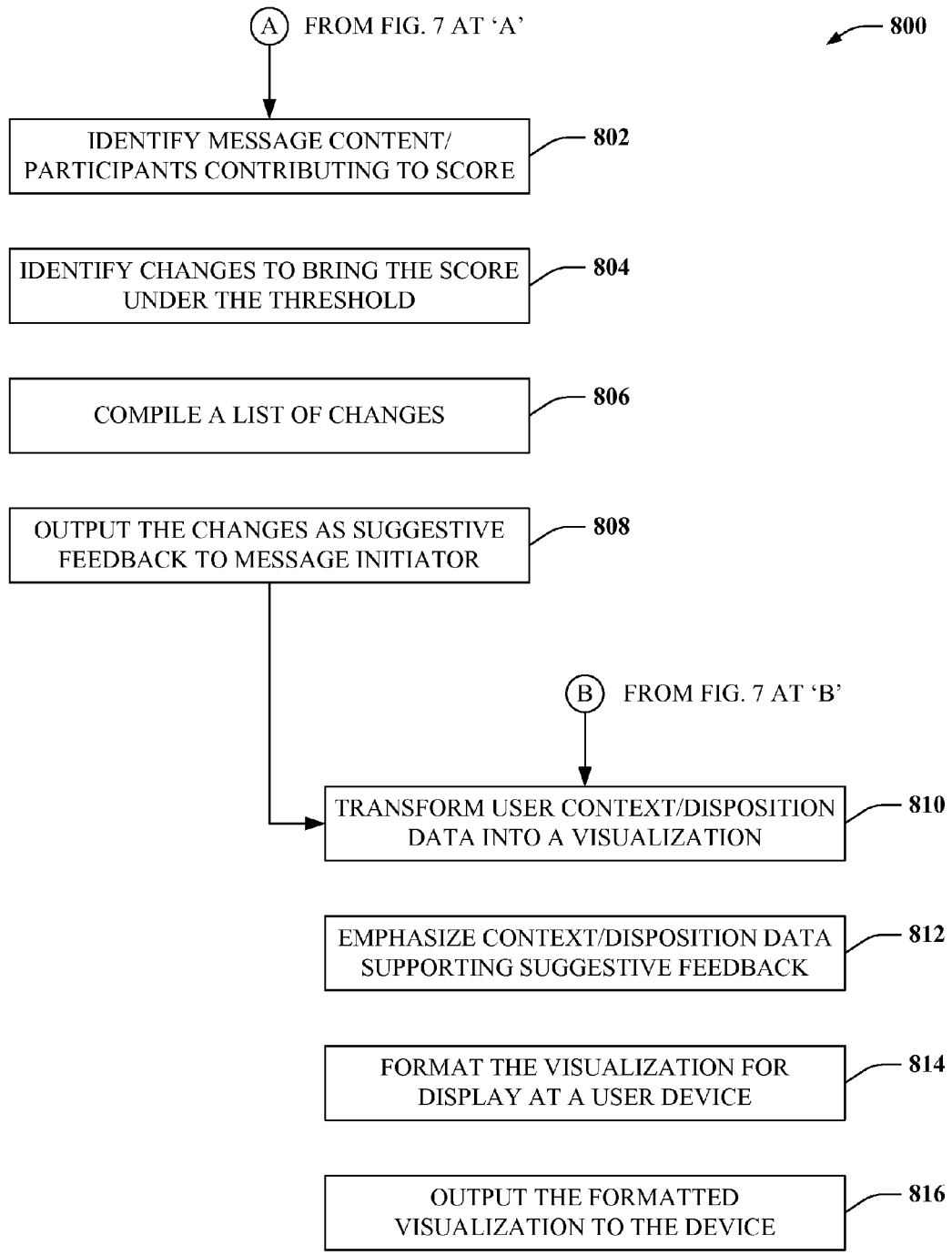

FIGS. 7 and 8 depict flowcharts of an example methodology 700, 800 for extracting rich contextual data from user usage of electronic communication and graphically rendering the data to other persons for rapid consumption. At 702, method 700 can identify initiation of an electronic message at a user device. Identification can be based on initiating a messaging application, logging onto a communication network, opening a web browser, generating a new message instance, entering data into a message instance, changing default style or format of a message instance, loading a custom style or format, or the like, or a combination thereof. At 704, method 700 can monitor compilation of the message. At 706, method 700 can analyze message content, style or format and determine a context thereof, as described herein. At 708, method 700 can identify participants to the message. For instance, information entered or included in a To field, Copy field, Blind Copy field, or the like, can be extracted and analyzed to identify user messaging aliases or user identities. At 710, method 700 can reference a context or disposition database for the identified participants. At 712, method 700 can compare the user context/disposition with the message content or context. At 714, method 700 can reference a set of messaging rules for scoring contextual compatibility of the message with respect to the identified participants, or user context/disposition thereof. At 716, method 700 can compare the compatibility score of the message with a threshold compatibility score. At 718, method 700 can determine whether the compatibility score complies with the threshold score (e.g., whether the score is greater than, less than, equal to, in accordance with a compatibility definition). If the compatibility score does not comply, method 700 continues at reference number 802 at methodology 800; otherwise, if the score does comply with the threshold score, method 700 can continue at reference number 810 at methodology 800.

Referring now to FIG. 8, methodology 700, 800 continues at 802 from methodology 718, if the message compatibility score does not comply with the threshold score. Thus, at 802, method 800 can identify message participants or aspects of message content contributing to the noncompliant score. At 804, method 800 can identify changes to the content or participants to bring the score in compliance with the threshold score. Changes can be based on affect of content or participants to the score, as well as relevance of one or more participants to message content, relevance of aspects of the content to message context or meaning, or the like. Thus, for instance, if one participant's messaging disposition renders the content of the score noncompliant with the threshold score, a suitable change might include removing such participant from the message. Such a decision can further be based on relevance of the message content to the participant, however. So, continuing the previous example, if the participant is the only direct recipient or one of few direct recipients, or the content is particularly relevant to a social or business context determined for the participant, modifying the content might be selected as a preferred modification to the message. At 806, method 800 can compile data characterizing the identified changes. At 808, method 800 can transform the compiled data into a suitable format for further processing. In one or more aspects, the processing can comprise biometric intelligence analysis of user usage or disposition, providing a physical characterization of user interaction with a network device, communication application, or the like. In other aspects, the processing can comprise graphical rendering for generating a visualization of the usage or disposition. In such aspects, the visualization can then be output to a user device employed by an initiator of the message. Additionally, the graphical rendering can be organized in a manner that emphasizes aspects of the message that result in a non-compliant compatibility score, or emphasize how changes to such aspects affect the resulting score, or both. Thus, the graphical output can be useful in presenting information justifying message modifications generated by methodology 800.

Method 800 can continue from 808, or from 718 where the message compatibility score complies with the threshold score, at reference number 810. Thus, at 810, method 800 can transform user context/disposition data pertinent to content or context of the message, into multi-dimensional visualization. At 812, method 800 can emphasize participant context or disposition data, or message content data, associated with any suggestive feedback. At 814, method 800 can format the visualization for display at a user device. At 816, method 800 can output the formatted visualization to such device.

Figure 9:
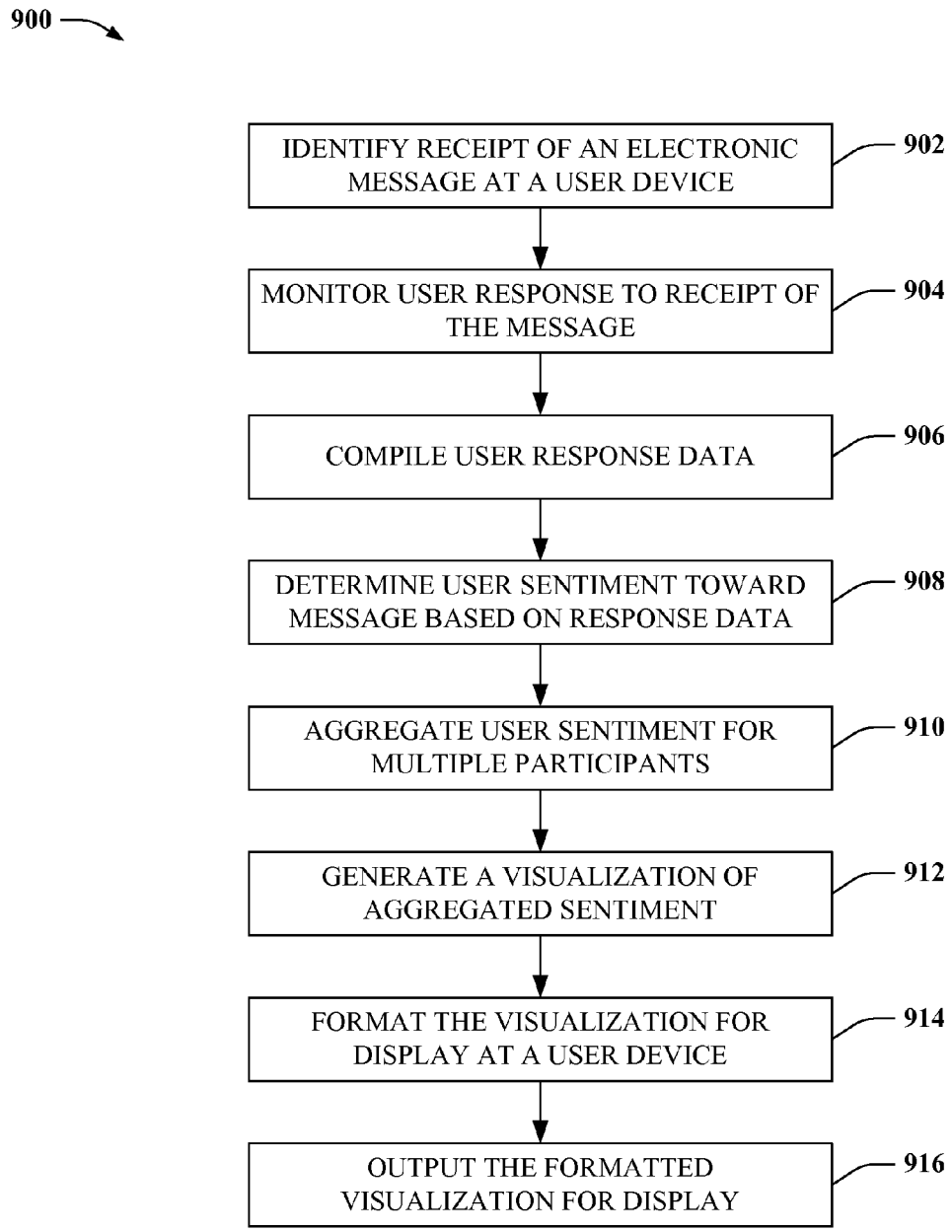
FIG. 9 illustrates a flowchart of a sample methodology for visualizing recipient response and sentiment toward a received message according to further aspects.

FIG. 9 illustrates a flowchart of an example methodology 900 for providing visual rendering of recipient response or sentiment toward electronic messaging. At 902, method 900 can identify receipt of an electronic message at a user device. At 904, method 900 can monitor user response to such receipt of the message. Monitoring user response can include tracking user activity associated with the message, such as deleting, forwarding, replying to, copying, opening the message, or the like, or moving the message into a user-defined folder, and so on. Additionally, the tracking can determine a delay in responding to the activity, compare an identified activity to typical response activity, or other time or frequency based statistical representations of user responsiveness. In at least one aspect, monitoring user response can comprise obtaining explicit user input (e.g., a message ranking obtained via a user interface). In at least one additional aspect, the user response can be characterized with sensor data, such as video sensor data, audio sensor data, or biometric sensor data, as described herein or known in the art.

Further to the above, at 906, method 900 can compile user response data characterizing user actions, reactions, or activity determined in response to the message being receiving at a user device. At 908, method 900 can determine a sentiment of the user from the compiled response data. At 910, method 900 can optionally aggregate user sentiment for multiple participants. At 912, method 900 can generate a visualization of user sentiment for one or more users receiving the message. At 914, method 900 can format the visualization for display at a user device. At 916, method 900 can output the formatted visualization to such user device.

Figure 10:
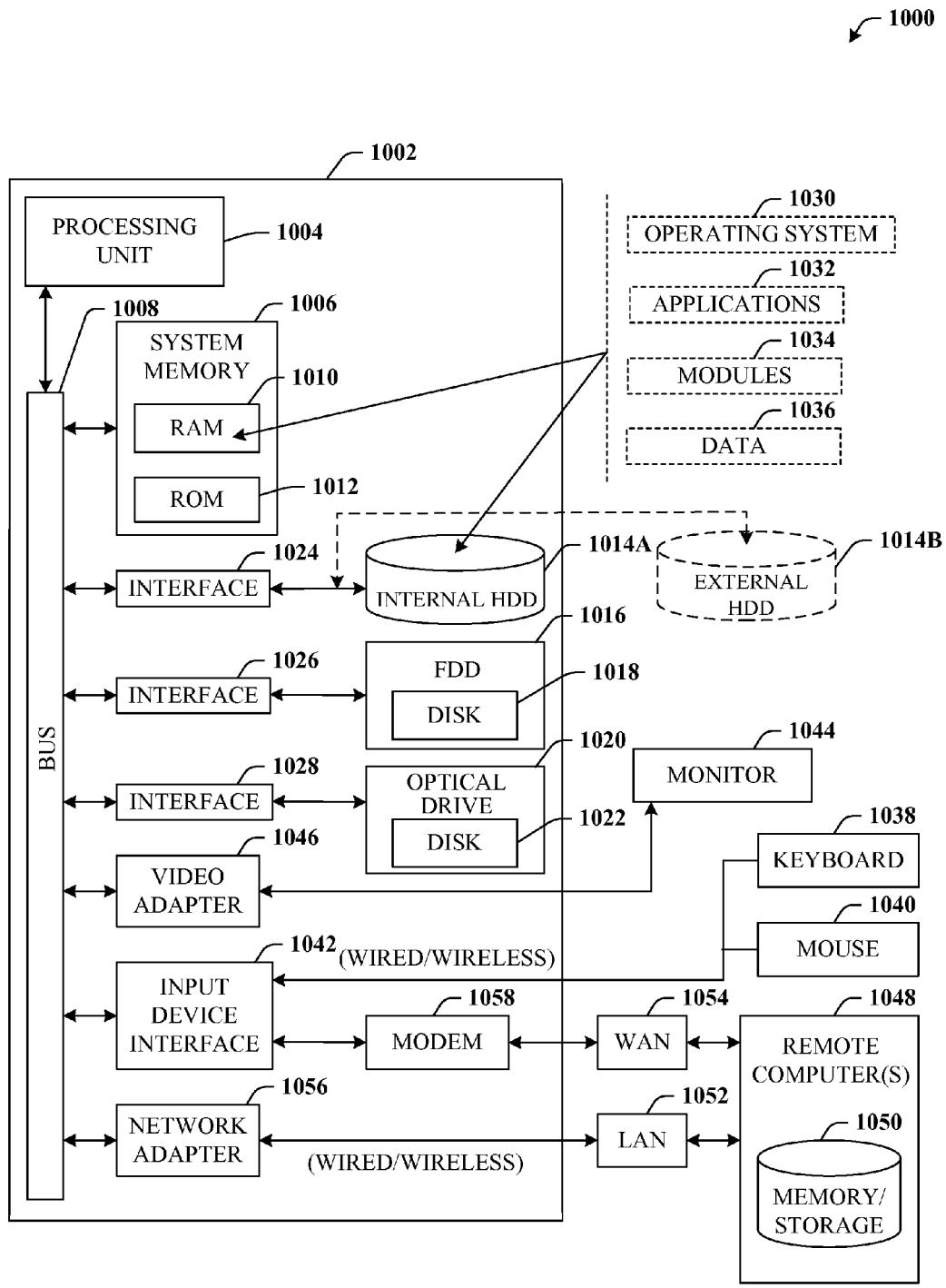
FIG. 10 depicts a block diagram of a suitable operating environment for graphically rendering user context or sentiment according to aspects of the disclosure.

Referring now to FIG. 10, there is illustrated a block diagram of an exemplary computer system operable to compile and graphically rendering user context or sentiment information according to aspects of the disclosure, as well as execute other aspects of the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above can be suitable for application in the general context of computer-executable instructions that can run on one or more computers, the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer, and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of the claimed subject matter includes a computer 1002, the computer 1002 including a processing unit 1004, a system memory 1006 and a system bus 1008. The system bus 1008 couples system components including, but not limited to, the system memory 1006 and the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014A (e.g., EIDE, SATA), which internal hard disk drive 1014A can also be configured for external use (1014B) in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, can be connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, within wireless communication range of a base station. WiFi networks use radio technologies called IEEE802.11 (a, b, g, n, etc.) to provide secure, reliable, fast wireless connectivity. A WiFi network can be used to connect computers to each other, to the Internet, and to wired networks (which use IEEE802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
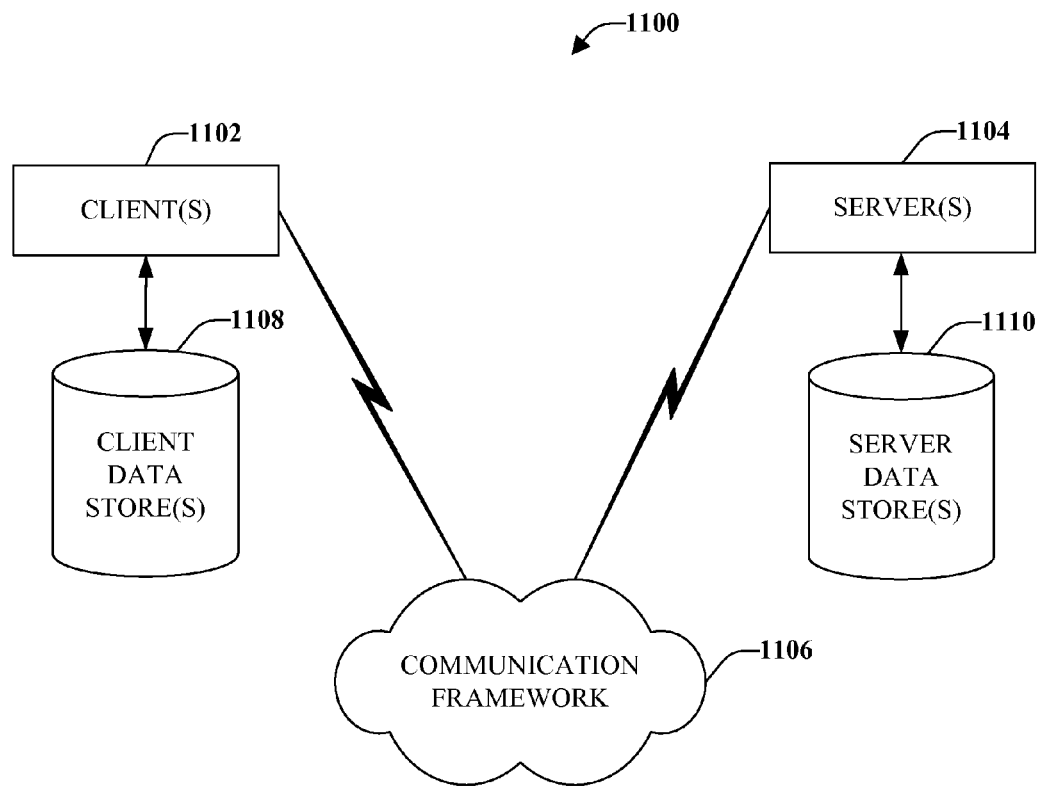
FIG. 11 illustrates a block diagram of a sample remote communication environment facilitating electronic messaging for remote user devices.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art can recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature can be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
   one or more processors;
   memory communicatively coupled to the one or more processors;
   an analysis component that is stored in the memory and that is configured to evaluate an electronic message and identify participants to the electronic message;
   a database that is configured to organize contextual data for each of the participants, the contextual data of each of the participants being based at least in part on the evaluation of the electronic message, the contextual data of each of the participants indicating a preferred electronic messaging application that is utilized by the participant; and
   a graphics component that is stored in the memory and that is configured to transform the contextual data for each of the participants into a multi-dimensional visualization, the multi-dimensional visualization displaying visual representations that each correspond to one or more of the participants, the visual representations being organized into a first group and a second group, the first group of visual representations representing one or more of the participants that utilize a first type of electronic messaging application, the second group of visual representations representing one or more of the participants that utilize a second type of messaging application.

2. The system of claim 1, further comprising:
   a rendering component configured to display the multi-dimensional visualization at a user interface display of at least one of the participants.

3. The system of claim 2, further comprising:
   a feedback component configured to output suggested changes to message content or a participant list based on the contextual data of at least one of the participants.

4. The system of claim 3, wherein the graphics component is configured to emphasize context within the multi-dimensional visualization to support the suggested changes.

5. The system of claim 2, wherein the multi-dimensional visualization displays the visual representations arranged as nodes of a connectivity map, where positions of the nodes are based upon similarity of contextual data of each of the participants.

6. The system of claim 2,
   wherein the contextual data for each of the participants further indicates the participant's usage of electronic messaging, and the system further comprises:
   a relevance component configured to weight, for at least one of the participants, the participant's usage of electronic messaging with a degree of relatedness to a message initiator,
   wherein the multi-dimensional visualization is organized based on the weighted participant's usage of electronic messaging, or
   the visualization is annotated with the weighted participant's usage of electronic messaging.

7. The system of claim 1, further comprising:
   a tracking component configured to monitor user response of at least one of the participants to the electronic message and compile or capture sentiment data based on the monitored user response, the sentiment data indicating a sentiment of the at least one of the participants toward the electronic message; and
   a data server configured to submit the sentiment data to the database.

8. The system of claim 1, wherein the contextual data of each of the participants further indicates a likelihood of receipt of the electronic message by the participant, the contextual data being based at least in part on an activity schedule of the participant that is obtained from a data source.

9. The system of claim 7, wherein the user response is based on or includes at least one of:
biometric sensor data of the at least one of the participants;
opening, deleting, replying to or forwarding the electronic message, or an order thereof;
delay in opening, deleting, replying to or forwarding the electronic message, after receipt of the electronic message;
adding or deleting participants in a response or a forward of the electronic message;
an identity and context of added or deleted participants, relative to a recipient;
content or context of a response to the electronic message;
explicit user input from the at least one of the participants; or
a combination thereof.

10. The system of claim 1, wherein the contextual data further indicates one or more of:
a physical location or local time of the participant;
a device or application that the participant is logged onto a network with;
a preferred time of day that the participant reads or responds to messages;
a statistical characterization of the participant's messaging activity; or
explicit participant input.

11. A method, comprising:
analyzing content of and identifying participants to an electronic message;
referencing contextual data for each of the participants, the contextual data of each of the participants indicating a preferred electronic messaging application that is utilized by the participant;
transforming the contextual data for each of the participants into a multi-dimensional visualization, the multi-dimensional visualization displaying visual representations that each correspond to one or more of the participants, the visual representations being positioned according to a type of electronic messaging application that is used, the visual representations including a first visual representation for a participant of the participants that uses a first type of electronic messaging application and a second visual representation for a participant of the participants that uses a second type of electronic messaging application; and
outputting the multi-dimensional visualization for display at a user interface employed by at least one of the participants.

12. The method of claim 11, further comprising:
recommending a change to message content or message recipients based on the contextual data.

13. The method of claim 12, further comprising:
highlighting a portion of information within the multi-dimensional visualization, the portion of information being associated with the recommended change.

14. The method of claim 11, further comprising:
generating a connectivity map for the participants of the communication based on prior messaging between the participants, or prior communications in a chain of messages associated with the electronic message, and displaying the connectivity map with the electronic message.

15. The method of claim 14, further comprising:
customizing the connectivity map for a particular participant, the particular participant being a central node of the customized map.

16. The method of claim 11, further comprising:
monitoring a response of at least one of the participants to the electronic message and determining from the response a sentiment of the at least one of the participants.

17. The method of claim 11, further comprising:
generating, for each of the participants, sentiment data indicating a sentiment of at least one of the participants; and
transforming the generated sentiment data of each of the participants into a visualization of recipient message sentiment.

18. The method of claim 17, wherein the transforming the contextual data into the multi-dimensional visualization includes identifying a common sentiment from among the generated sentiments of each of the participants, and spatially or temporally clustering individual sentiments based on relevance to the common sentiment.

19. The method of claim 11, further comprising:
analyzing the contextual data to identify a most prevalent context or disposition for the participants; and
establishing the most prevalent context or disposition as a central node of a connectivity map and organizing contexts or dispositions of the participants spatially around the central node based on the commonality between each of the contexts or dispositions of the participants to the most prevalent context or disposition.

20. A visualization system, comprising:
one or more processors;
memory communicatively coupled to the one or more processors;
an analysis component that is stored in the memory and that is configured to identify participants of an electronic message;
a database that is configured to organize contextual data for each of the participants, the contextual data indicating inter-relationships between the participants;
a tracking component that is stored in the memory and that is configured to:
monitor participant response to the electronic message, the monitoring including determining (i) whether the electronic message is opened, deleted, or forwarded and (ii) an amount of time from receiving the electronic message to opening, deleting, or forwarding the electronic message, and
compile sentiment data based on the monitored participant response, the sentiment data indicating participant sentiment toward the electronic message;
a relevance component that is stored in the memory and that is configured to employ the inter-relationships to weight participant sentiment for each of the participants based on a degree of association to a message initiator; and
a graphics component that is stored in the memory and that is configured to transform a subset of the weighted sentiment into a multi-dimensional visualization of participant sentiment toward the electronic message.

* * * * *